(12) United States Patent
Wessels et al.

(10) Patent No.: US 10,850,217 B2
(45) Date of Patent: Dec. 1, 2020

(54) DEWATERING SCREW PRESS

(71) Applicants: Philip Wessels, Saint James, MN (US); Marco Doda, Buscoldo (IT)

(72) Inventors: Philip Wessels, Saint James, MN (US); Marco Doda, Buscoldo (IT)

(*) Notice: Subject to any disclaimer, the term of this patent is extended or adjusted under 35 U.S.C. 154(b) by 114 days.

(21) Appl. No.: 16/186,281

(22) Filed: Nov. 9, 2018

(65) Prior Publication Data

US 2019/0168138 A1 Jun. 6, 2019

Related U.S. Application Data

(60) Provisional application No. 62/593,365, filed on Dec. 1, 2017.

(51) Int. Cl.
| | | |
|---|---|---|
| B01D 29/54 | (2006.01) |
| B01D 29/15 | (2006.01) |
| B01D 29/92 | (2006.01) |
| B01D 29/90 | (2006.01) |
| B01D 29/23 | (2006.01) |
| B01D 29/64 | (2006.01) |
| B01D 29/35 | (2006.01) |

(52) U.S. Cl.
CPC ............ B01D 29/54 (2013.01); B01D 29/15 (2013.01); B01D 29/23 (2013.01); B01D 29/356 (2013.01); B01D 29/6476 (2013.01); B01D 29/90 (2013.01); B01D 29/92 (2013.01)

(58) Field of Classification Search
CPC ........ B01D 29/54; B01D 29/15; B01D 29/23; B01D 29/356; B01D 29/6476; B01D 29/90; B01D 29/92; B63H 11/117; B01F 7/088; B23B 45/044; B25J 9/148; E01C 2019/208; E01C 2019/209; E02D 2250/0038; E01H 1/042; C12M 27/20; A01C 15/18; F25C 2700/08; F26B 11/0481; G01N 2223/086; G01N 2001/1481; G01N 23/2276; G01G 11/083; G03G 15/0822; H01J 2237/2511; H01J 49/08; H01H 35/40; Y10S 165/148; Y10T 477/6353; Y10T 137/7786; Y10T 29/49245

See application file for complete search history.

(56) References Cited

U.S. PATENT DOCUMENTS

| | | | |
|---|---|---|---|
| 6,634,508 B1* | 10/2003 | Ishigaki ................. | B01D 29/54 210/415 |
| 2011/0318062 A1* | 12/2011 | Hayashi ............. | G03G 15/0822 399/254 |
| 2015/0060341 A1* | 3/2015 | Mitchell ................ | B01D 33/11 210/197 |

* cited by examiner

*Primary Examiner* — Bobby Ramdhanie
*Assistant Examiner* — Donovan Bui-Huynh

(57) ABSTRACT

A dewatering screw press has an auger within a case and driven by a motor. Influent material is received through an intake into the case near a proximal end of the auger, where it is driven toward a distal output by the auger. While the influent is driven along the exterior of the auger by a first spiraled fin of the auger, the influent passes by mesh screens in the case and the auger. As the influent material passes by the screens, liquids in the material pass through but solids are prevented from doing so. A second spiraled fin, internal to the auger and spiraled inversely to the first spiraled fin, impels liquid received into the cavity of the auger backward toward a proximal output located at the proximal end of the auger.

11 Claims, 4 Drawing Sheets

DEWATERING SCREW PRESS

The current application claims a priority to the U.S. Provisional Patent application Ser. No. 62/593,365 filed on Dec. 1, 2017.

FIELD OF THE INVENTION

The present invention relates generally to organic waste processing devices. More particularly, the present invention is a dewatering screw press used to separate solid and liquid matter.

BACKGROUND OF THE INVENTION

Dewatering screw presses are often used in processes that requires the separation of solids and liquids. They can be used in food and beverage industries, organic waste industries, chemical process industries, architectural industries, renewable energy, and a multitude of others. Their simple operation accomplishes dewatering by continuous gravitational drainage coupled with the squeezing of material against a screen, thus keeping solids on one side of the screen and liquids on the other. Such presses have a fair amount of moving mechanical components and utilize large amounts of electric power to drive the auger which moves the mixed material against the screens. As such, they require periodic maintenance which can be costly as well as generating costly power bills. Anything that can be done to reduce either of these costs results in savings for not only the operator, but those who purchase or deal with downstream products from the presses. Accordingly, there exists a need for a means by which usage and operation of dewatering presses can be enhanced to increase their efficiency, maintenance intervals, and decrease their power utilization and transportation costs.

The development of the organic waste processing device of the present invention fulfills this need. The present invention is a dewatering screw press with enhanced features and is intended for use in separating liquid and solid matter for organic waste processing, though the present invention may be used for any similar purpose. Upon initial observation of the present invention, it appears as a conventional screw press used in a wide variety of industries to separate liquids from solids. However, after closer inspection, it can be seen that in addition to the screen assembly or assemblies located around the perimeter of the auger, the present invention also has a screen system built into the auger itself. Thus, as the auger turns, liquids can be driven into the hollow cavity of the auger. The screw conveyer nature of the auger then transports the liquids to one end of the auger where they transfer through a rotating face assembly and join the other liquid that is obtained through the conventional perimeter screen(s). Such features permit greater separation of liquids and solids resulting in increased performance metrics. Additionally, the invention reduces reduce wear and pressure on internal components leading to longer life, while electrical power usage is reduced as well. The use of the present invention allows enhanced liquid and solid separation from a dewatering screw press in a manner which is quick, easy, and effective.

The materials required to produce the present invention are all readily available and well known to manufacturers of goods of this type. It is envisioned that the majority of the components used in the invention would be made of stainless steel in a casting and machining process, though the present invention should not be considered to be limited to such materials and processes. Such a process would require the design and use of custom molds; however, many components could be the same as utilized for a conventional screw press. Other components would be formed of stainless steel in a stamping operation prevent corrosion. The remaining components of the present invention such as the additional screens, rotating face assembly, drive motors, control systems, and the like, would best be procured from manufacturers and wholesalers that deal in goods of that nature and assembled at a final location. The relatively simple design of the various components and the materials of construction make the present invention a cost-effective design due to the relatively low material and labor costs involved. Production of the present invention may be performed by manufacturing workers of average skill.

DETAIL DESCRIPTIONS OF THE INVENTION

Figure 1:
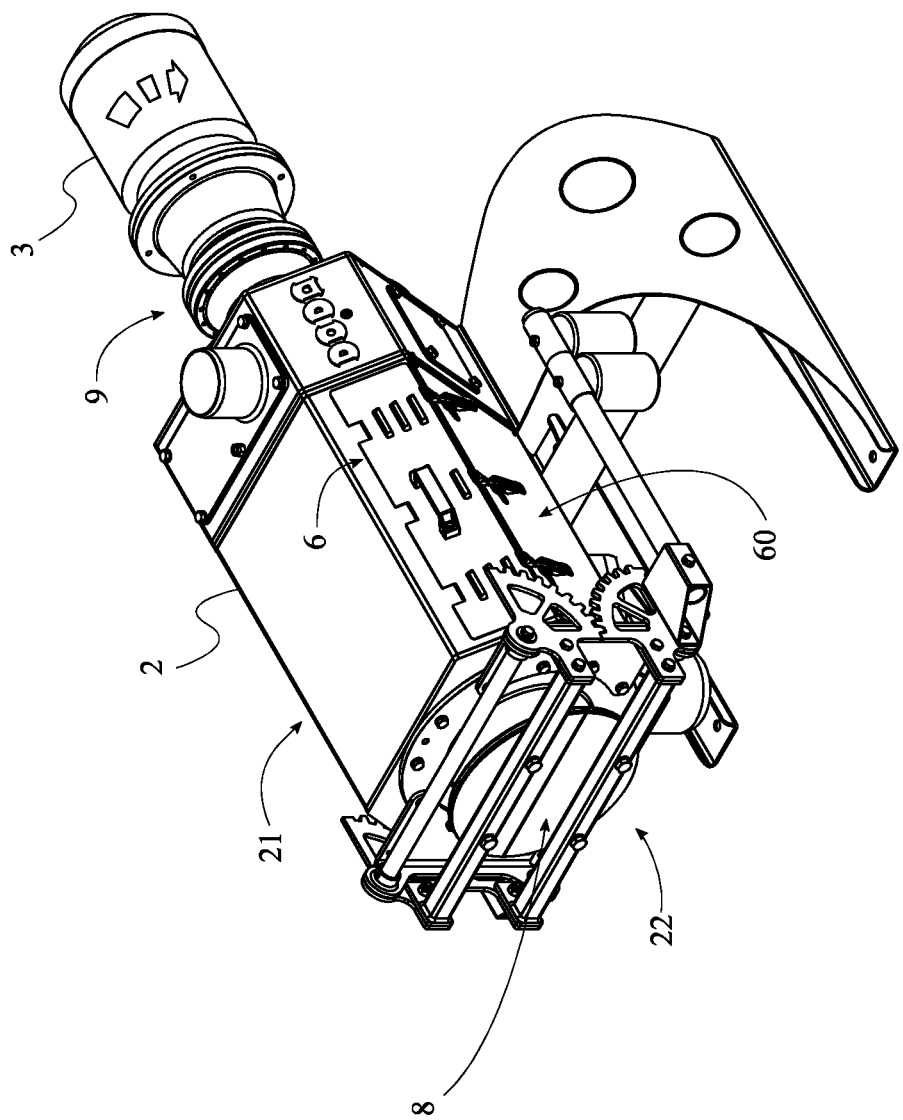
FIG. 1 is a perspective view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The present invention is an improved dewatering screw press intended for use in processing organic waste matter by separating liquids and solids. The separator resembles a conventional dewatering screw press but comprises additional filtration means incorporated into the separator unit. In the preferred embodiment of the present invention, the separator is a standalone dewatering screw press. In another embodiment of the present invention, the separator can also be an add-on to an existing dewatering screw press where additional filtration media components may be retrofitted onto the existing unit.

Referring to FIGS. 1-4, in general, the present invention comprises an auger 1, a case 2, a motor 3, at least one external screen 5, an intake 6, at least one liquid output 7, and a solid output 8. Furthermore, the at least one liquid output 7 comprises a proximal output 71.

The auger 1 is a screw-like member that mechanically forces influent material fed into the intake 6 through the case 2 to the solid output 8. In the preferred embodiment of the present invention, the auger 1 comprises an auger body 11, a first spiraled fin 12, a cavity 13, a second spiraled fin 14, at least one auger aperture 15, at least one internal screen 16, a proximal end 17, and a distal end 18. The auger 1 is positioned within the case 2 between a lower end 22 and an upper end 21 of the case 2, and the auger body 11 extends longitudinally from the proximal end 17 to the distal end 18. Preferably, the auger 1 is centrally mounted within the case 2. More particularly, in some embodiments the proximal end 17 of the auger 1 is positioned within the case 2 adjacent to the motor 3. In some embodiments, a gearbox 9 may be comprised between the motor 3 and auger 1. Thus, in some embodiments, the proximal end 17 of the auger 1 is positioned within the case 2 adjacent to the gearbox 9. The specific means of supporting the auger 1 within the case 2 is not of particular importance, however, to the spirit of the present invention, and many various configurations may be utilized to accomplish the desired purpose of the present invention.

The intake 6 traverses through the case 2 adjacent to the auger 1—more specifically, through the upper end 21 of the case 2, adjacent the proximal end 17 of the auger 1—while the solid output 8 traverses through the case 2 adjacent to the distal end 18 of the auger 1. The first spiraled fin 12 is externally connected to the auger body 11, and traverses longitudinally along the auger body 11 between the proximal end 17 and the distal end 18. The motor 3 is operatively connected to the auger 1, such that the motor 3 is configured to rotate the auger 1 in a specified direction about a longitudinal axis of the auger 1, which traverses between the proximal end 17 and the distal end 18, in order to drive influent material received through the intake 6 through the case 2 toward the solid output 8 using the first spiraled fin 12 of the auger 1. The solid output 8 may vary in different embodiments of the present invention, and may be understood to at least comprise an output aperture 75 through which the separated solid material is driven and henceforth collected.

While solid influent material is driven by the rotation of the auger 1 and thus through the first spiraled fin 12, liquid portions of the influent material pass through the at least one external screen 5 away from the auger 1 within the case 2, and through the at least one internal screen 16 into the cavity 13 of the auger 1. The cavity 13 internally traverses through the auger body 11 between the proximal end 17 and the distal end 18. The second spiraled fin 14 is internally connected to the auger body 11 within the cavity 13, and longitudinally traverses within the cavity 13 between the proximal end 17 and the distal end 18. The first spiraled fin 12 and the second spiraled fin 14 are spiraled inversely to each other, so that while the first spiraled fin 12 drives material in a direction from the proximal end 17 toward the distal end 18, the second spiraled fin 14 drives material in the opposite direction, from the distal end 18 toward the proximal end 17. Thus, a first spiral direction of the first spiraled fin 12 is oriented opposite a second spiral direction of the second spiraled fin 14. For example, the first spiraled fin 12 may be spiraled in a clockwise direction, while the second spiraled fin 14 is spiraled in a counter-clockwise direction, or vice versa.

Each of the at least one external screen 5 is positioned around the auger 1 between the proximal end 17 and the distal end 18, wherein each of the at least one external screen 5 is configured to be permeable to liquid material and impermeable to solid material. Preferably, the at least one external screen 5 is a cylindrical in shape and concentrically positioned around the auger, and the diameter of the at least one external screen 5 is approximately that of the lateral radius of the first spiraled fin 12. As the auger 1 turns, the first spiraled fin 12 pressed influent material against the external screen 5, extracting liquid material through the at least one external screen 5 while keeping solid material within the external screen 5 to be driven toward the distal end 18 and the solid output 8. Thus, while the auger 1 drives influent material past the at least one external screen 5, water and/or other liquids are removed from the driven material through the at least one external screen 5 and may be collected. Any desired means may be utilized to collect and/or dispose of the removed liquid material exiting the case 2. This is the first of two means disclosed herein through which water and/or other liquids are separated from influent material in the preferred embodiment of the present invention.

The second means of separating water from influent material in the present invention is as follows: each of the at least one auger aperture 15 traverses through the auger body 11 into the cavity 13, and each of the at least one internal screen 16 is connected within one of the at least one auger aperture 15, wherein each of the at least one internal screen 16 is configured to be permeable to liquid material and impermeable to solid material. As a result, liquid material is removed from the main portion of material external to the auger 1 and received through the at least one internal screen 16 within the cavity 13 of the auger 1.

The proximal output 71 is positioned adjacent to the proximal end 17 of the auger 1 such that the cavity 13 is in fluid communication with the proximal output 71 at the proximal end 17. Thus, as the augur is turned by the motor 3, the second spiraled fin 14 is configured to impel liquid effluent material within the cavity 13 out of the proximal end 17 and into the proximal output 71. From there, the liquid effluent material may be collected from the proximal output 71 using any desired configuration.

In view of the foregoing therefore, the present invention presents an improved design for a dewatering screw press utilizing two means to separate liquid from the bulk of influent material: one set of screens traversing through the case 2, and another set of screens traversing through the auger 1 into the cavity 13 of the auger 1.

Figure 2:
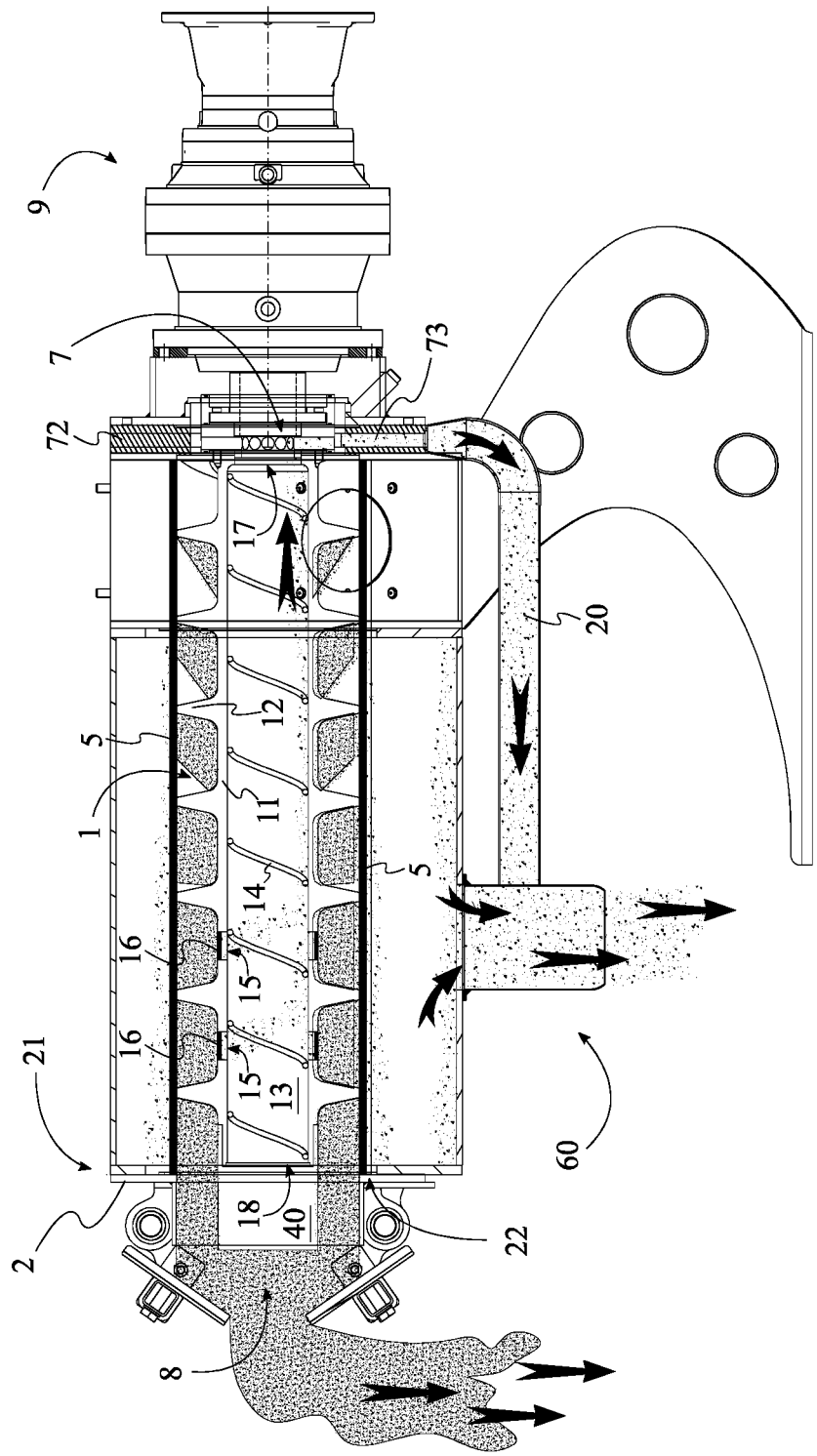
FIG. 2 is a side cross-sectional illustration of the present invention during operation.
Figure 3:
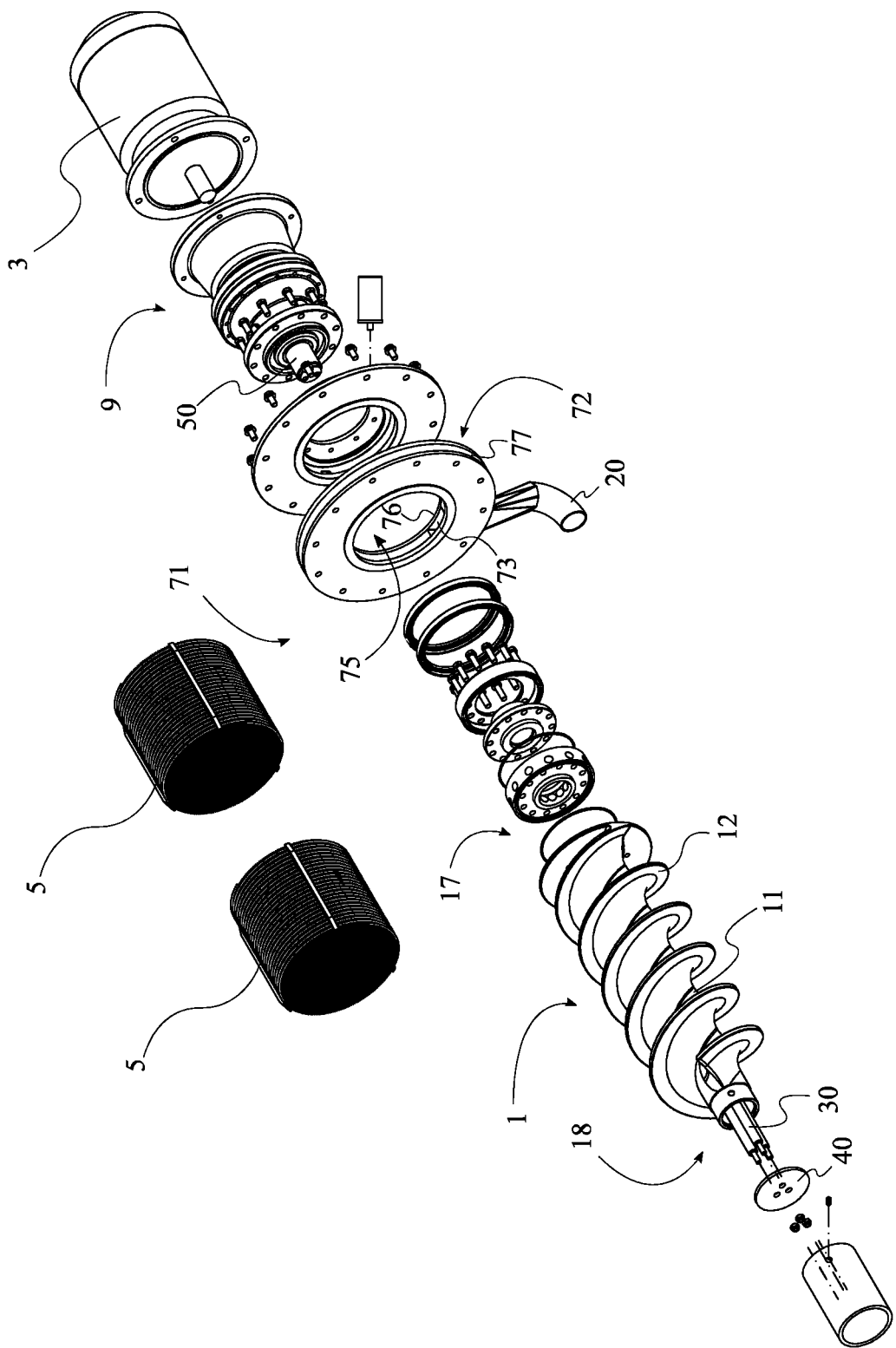
FIG. 3 is a perspective exploded internal view of the present invention.
Figure 4:
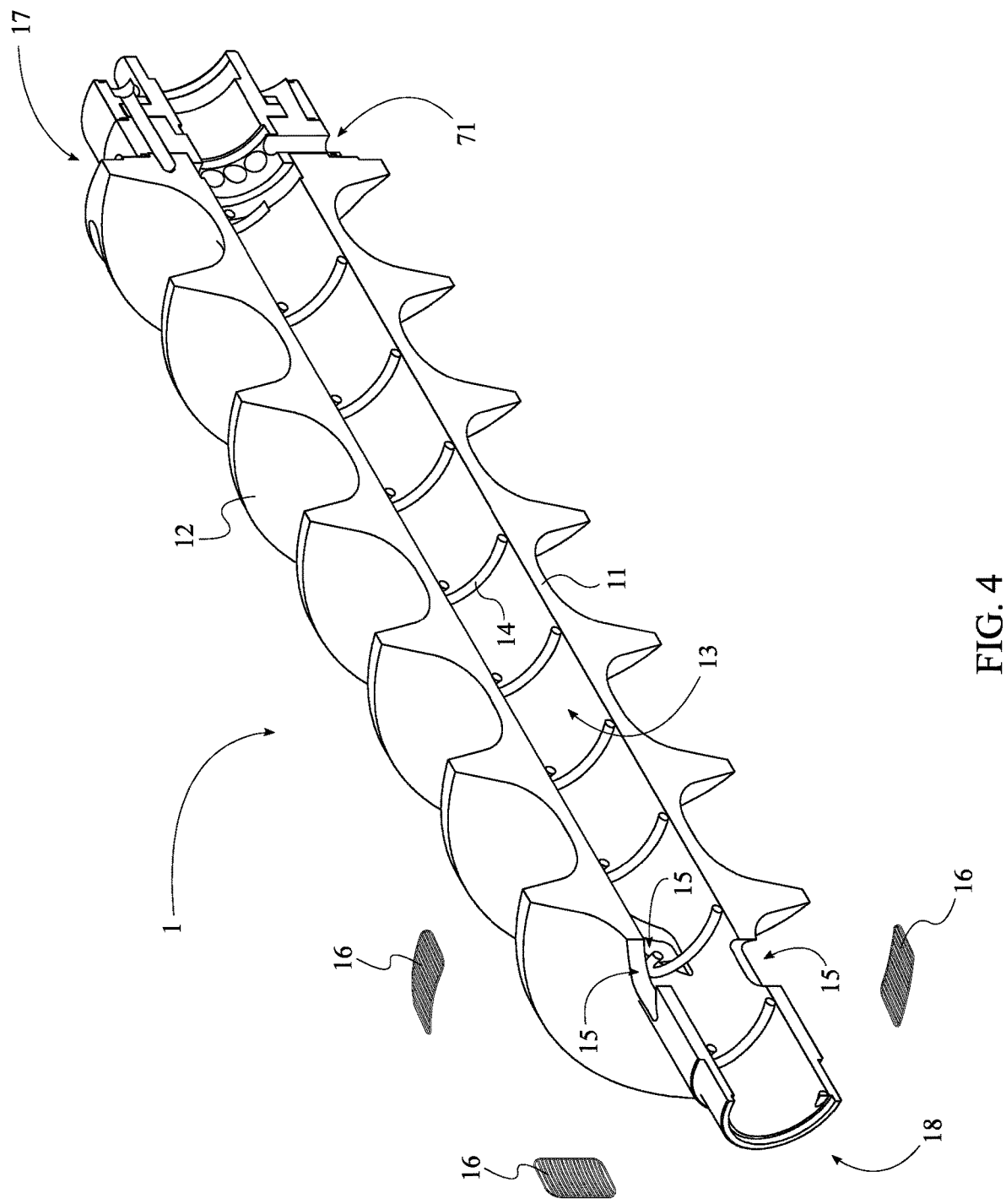
FIG. 4 is a perspective cross-sectional view of the auger of the present invention.

Furthermore, referring to FIGS. 2-3, in some embodiments the proximal output 71 comprises an output bracket 72, and the output bracket 72 is connected to the proximal end 17 of the auger 1. The output bracket 72 comprises an output port 73, and the output port 73 traverses through the output bracket 72. The separated liquid passes out of the proximal end 17 of the auger 1 and through the output port 73, and may be collected from the output port 73 by any desired means.

More particularly, some embodiments of the present invention may further comprise a duct 20, while the output bracket 72 further comprises a bracket body 74, an aperture 75, an inner lateral surface 76, and an outer lateral surface 77. The aperture 75 traverses centrally through the bracket body 74, which preferably has an annular shape. The aperture 75 is bounded by the inner lateral surface 76, and the bracket body 74 extends between the inner lateral surface 76 and the outer lateral surface 77. The output port 73 traverses through the inner lateral surface 76 and the outer lateral surface 77, and the duct 20 is connected to the outer lateral surface 77 adjacent to the output port 73. Thus, liquid effluent is ejected from within the proximal end 17 of the cavity 13, through the output port 73, and into the duct 20, and any desired means may be utilized to collect the liquid effluent from the duct 20.

Some embodiments of the present invention further comprise a liquid effluent reservoir 60 or multiple reservoirs for collecting the liquid effluent extracted utilizing the aforementioned means, as shown in FIG. 2. Generally, the case 2 is in fluid communication with the liquid effluent reservoir 60 through the at least one external screen 5. For example, the liquid effluent reservoir 60 may be positioned beneath the case 2 such that liquid effluent passing through the at least one external screen 5 simply falls into the liquid effluent reservoir 60. Furthermore, the at least one liquid output 7 is also in fluid communication with the liquid effluent reservoir 60, or the liquid output 7 may be in fluid communication with its own liquid effluent reservoir 60 in some embodiments. More particularly, in some embodiments, the aforementioned duct 20 is in fluid communication with the liquid reservoir, such that liquid effluent ejected from the proximal end 17 of the cavity 13 passes through the duct 20 and into the liquid effluent reservoir 60.

It should be noted herein that any relevant and useful mechanical means may be utilized to drive the auger 1 using the motor 3 in various embodiments of the present invention. However, in the preferred embodiment, referring to FIG. 3, at least one connecting member 30 is comprised. The at least one connecting member 30 is operatively connected to the motor 3, such that the motor 3 is configured to rotate the at least one connecting member 30. Furthermore, the at least one connecting member 30 traverses through the cavity 13 of the auger 1 and is rotationally coupled to the auger 1. Thus, by rotating the at least one connecting member 30, the motor 3 rotates the auger 1. Furthermore, the preferred embodiment of the present invention further comprises an end cap 40. The end cap 40 is connected to the distal end 18 of the auger 1, and the end cap 40 is connected to the at least one connecting member 30 opposite the motor 3 along the at least one connecting member 30. Thus, through the preceding arrangement, the at least one connecting member 30 is rotationally coupled to the auger 1.

Furthermore, in some embodiments the present invention further comprises a gearbox 9 and a rotational coupler 50. The motor 3 is operatively connected to the gearbox 9, and the rotational coupler 50 is operatively connected to the gearbox 9 opposite the motor 3. The aforementioned at least one connecting member 30 is connected to the rotational coupler 50 opposite the gearbox 9, such that the motor 3 rotates the at least one connecting member 30 through the gearbox 9 and the rotational coupler 50. Thus, since the at least one connecting member 30 is rotationally coupled to the auger 1, the motor 3 turns the auger 1 through the gearbox 9, the rotational coupler 50, and the at least one connecting member 30.

Although the invention has been explained in relation to its preferred embodiment, it is to be understood that many other possible modifications and variations can be made without departing from the spirit and scope of the invention as hereinafter claimed.

What is claimed is:

1. A screw press comprising:
an auger;
a case;
a motor;
at least one external screen;
an intake;
at least one liquid output comprising a proximal output;
a solid output;
the auger comprising an auger body, a first spiraled fin, a cavity, a second spiraled fin, at least one auger aperture, at least one internal screen, a proximal end and a distal end;
the auger being positioned within the case between a lower end and an upper end of the case;
the auger body extending longitudinally from the proximal end to the distal end;
the intake traversing through the upper end of the case adjacent to the auger;
the solid output traversing through the case adjacent to the distal end;
the first spiraled fin being externally connected to the auger body;
the first spiraled fin longitudinally traversing along the auger body between the proximal end and the distal end;
the motor being operatively connected to the auger, wherein the motor is configured to rotate the auger about a longitudinal axis of the auger in order to drive influent material received through the intake through the case toward the solid output;
the cavity internally traversing through the auger body between the proximal end and the distal end;
the second spiraled fin being internally connected to the auger body within the cavity;
the second spiraled fin longitudinally traversing within the cavity between the proximal end and the distal end;
a spiral direction of the first spiraled fin being oriented opposite a spiral direction of the second spiraled fin;
each of the at least one external screen being positioned around the auger between the proximal end and the distal end, wherein each of the at least one external screen is configured to be permeable to liquid material and impermeable to solid material;
each of the at least one auger aperture traversing through the auger body into the cavity;
each of the at least one internal screen being connected within one of the at least one auger aperture, wherein each of the at least one internal screen is configured to be permeable to liquid material and impermeable to solid material; and
the cavity being in fluid communication with the proximal output at the proximal end, wherein the second spiraled fin is configured to impel liquid effluent within the cavity out of the proximal end and into the proximal output.

2. The screw press as claimed in claim 1 comprising:
the proximal end of the auger being mounted to the case adjacent to a gearbox.

3. The screw press as claimed in claim 1 comprising:
the proximal end of the auger being mounted to the case adjacent to the motor.

4. The screw press as claimed in claim 1 comprising:
the auger being centrally mounted within the case.

5. The screw press as claimed in claim 1 comprising:
the proximal output comprising an output bracket;
the output bracket being connected to the proximal end of the auger;
the output bracket comprising an output port; and
the output port traversing through the output bracket.

6. The screw press as claimed in claim 5 comprising:
a duct;
the output bracket further comprising a bracket body, an aperture, an inner lateral surface and an outer lateral surface;
the aperture traversing through the bracket body;
the aperture being bounded by the inner lateral surface;
the bracket body extending between the inner lateral surface and the outer lateral surface;
the output port traversing through the inner lateral surface and the outer lateral surface; and the duct being connected to the outer lateral surface adjacent to the output port, wherein liquid effluent is ejected from within the proximal end of the cavity through the output port into the duct.

7. The screw press as claimed in claim 1 comprising:

at least one connecting member;

the at least one connecting member traversing through the cavity of the auger;

the at least one connecting member being operatively connected to the motor, wherein the motor is configured to rotate the at least one connecting member; and the at least one connecting member rotationally coupled to the auger.

8. The screw press as claimed in claim 7 comprising:

an end cap;

the end cap being connected to the distal end of the auger; and the end cap being connected to the at least one connecting member opposite the motor along the at least one connecting member.

9. The screw press as claimed in claim 1 comprising:

a gearbox;

a rotational coupler;

the motor being operatively connected to a gearbox;

the rotational coupler being operatively connected to the gearbox opposite the motor;

at least one connecting member being connected to the rotational coupler opposite the gearbox, wherein the motor rotates the at least one connecting member through the gearbox and the rotational coupler; and the at least one connecting member being rotationally coupled to the auger.

10. The screw press as claimed in claim 1 comprising:

a liquid effluent reservoir; and the case being in fluid communication with the liquid effluent reservoir.

11. The screw press as claimed in claim 1 comprising:

a liquid effluent reservoir;

the proximal output comprising a duct; and the duct being in fluid communication with the liquid effluent reservoir.

\* \* \* \* \*